United States Patent
Ono et al.

(10) Patent No.: US 11,537,839 B2
(45) Date of Patent: Dec. 27, 2022

(54) ARITHMETIC PROCESSING DEVICE AND SYSTEM TO REALIZE MULTI-LAYER CONVOLUTIONAL NEURAL NETWORK CIRCUIT TO PERFORM PROCESS WITH FIXED-POINT NUMBER FORMAT

(71) Applicant: KABUSHIKI KAISHA TOSHIBA, Minato-ku (JP)

(72) Inventors: Mizuki Ono, Yokohama (JP); Kosuke Tatsumura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 1107 days.

(21) Appl. No.: 16/120,954

(22) Filed: Sep. 4, 2018

(65) Prior Publication Data

US 2019/0279071 A1   Sep. 12, 2019

(30) Foreign Application Priority Data

Mar. 12, 2018 (JP) .............................. JP2018-044298

(51) Int. Cl.
*G06N 3/04* (2006.01)
*G06N 3/08* (2006.01)

(52) U.S. Cl.
CPC ................. *G06N 3/04* (2013.01); *G06N 3/08* (2013.01)

(58) Field of Classification Search
CPC .................................. G06N 3/04; G06N 3/08
See application file for complete search history.

(56) References Cited

U.S. PATENT DOCUMENTS

2008/0201282 A1   8/2008   Garcia et al.
2019/0042935 A1*  2/2019   Deisher ................ G06N 3/0481

FOREIGN PATENT DOCUMENTS

JP   2008-536211   9/2008
JP   2017-59090    3/2017
(Continued)

OTHER PUBLICATIONS

Lin, D. et al., "Fixed Point Quantization of Deep Conventional Networks," JMLR W&CP, vol. 48, Proceedings of 33$^{rd}$ International Conference on Machine Learning, 2015, pp. 10.

(Continued)

*Primary Examiner* — Daniel T Pellett
(74) *Attorney, Agent, or Firm* — Oblon, McClelland, Maier & Neustadt, L.L.P.

(57) ABSTRACT

An arithmetic processing device to realize a multi-layer convolutional neural network circuit to perform a process with fixed-point number format, according to an embodiment comprising: a processing circuitry and a memory, the processing circuitry conducting: a learning process to perform weight learning or bias learning using learning data stored the memory to calculate initial weight values and initial bias values of the multi-layer convolutional neural network circuit; a trial recognition process to perform a recognition process to part of the learning data or of input data using the initial weight values and the initial bias values; a processing treatment process to multiply the initial weight values and the initial bias values by a positive constant to calculate processed weight values or processed bias values; and a recognition process to perform a recognition process using the processed weight values and the processed bias values.

14 Claims, 5 Drawing Sheets

(56) References Cited

FOREIGN PATENT DOCUMENTS

JP         2017-156941     9/2017
WO    WO-2016039651 A  *  3/2016  ............. G06F 7/483

OTHER PUBLICATIONS

Krizhevsky, A. et al., "ImageNet Classification with Deep Convolutional Neural Networks," Neural Information Processing Systems, 2012, vol. 25, No. 2, pp. 9.

* cited by examiner

ARITHMETIC PROCESSING DEVICE AND SYSTEM TO REALIZE MULTI-LAYER CONVOLUTIONAL NEURAL NETWORK CIRCUIT TO PERFORM PROCESS WITH FIXED-POINT NUMBER FORMAT

CROSS REFERENCE TO RELATED APPLICATIONS

This application is based upon and claims the benefit of priority from the prior Japanese Patent Application No. 2018-044298, filed on Mar. 12, 2018, the entire contents of which are incorporated herein by reference.

FIELD

Embodiments described herein relate generally to an arithmetic processing device and system that realize a multi-layer convolutional neural network circuit that performs a process with fixed-point number format.

BACKGROUND

A conventional arithmetic processing device, which realizes a multi-layer convolutional neural network circuit performs, for instance, a recognition process using weight and bias values obtained by a learning process, with no process to the weight or bias values. In this recognition process, first of all, a learning processor performs learning using learning data, to calculate weight and bias values of each layer. And then, a recognition processor performs recognition of input data using the weight and bias values obtained in each layer, to obtain a result of recognition.

It is a matter of course that the magnitude of an intermediate value appeared in each layer processing depends on layers. Therefore, in general, comparatively large values are treated in some layers whereas comparatively small values are treated in other layers.

When an arithmetic processing with fixed-point number processes is performed, the arithmetic processing in layers where comparatively large values appear is performed with extremely high accuracy, which results in usage of memories having extremely large capacity. Conversely, in layers where comparatively small values appear, an arithmetic processing with fixed-point number processes is performed under the situation of treating extremely large values, which also results in usage of memories having extremely large capacity. Either case requires preparing memories having extremely large capacity, so that the conventional arithmetic processing device has a problem of increase in production cost.

A method has been tried to set a specific number of bits in fixed-point number calculation for each layer of a multi-layer convolutional neural network circuit. However, this method has a problem of complex processing compared to a method of processing with fixed-point number calculation with the same number of bits over the entire layers.

Moreover, when the number of bits required for arithmetic processing is 16 or smaller, each of 32-bit DSPs (Digital Signal Processors) can be used as two DSPs, which is practically equivalent to twice the number of DSPs. Therefore, the freedom of parallel processing is increased to shorten the time required for the entire processing, thereby achieving high-speed operation. This can be stated in another way as follows. When the number of bits used in fixed-point number processes is more than necessary, the freedom of parallel processing is decreased to extremely lengthen the time required for the entire processing, thereby restricting high-speed operation. Accordingly, the conventional arithmetic processing device has a problem of difficulty in achieving high-speed operation.

DETAILED DESCRIPTION

An arithmetic processing device to realize a multi-layer convolutional neural network circuit to perform a process with fixed-point number format, according to an embodiment comprising: a processing circuitry and a memory, the processing circuitry conducting: a learning process to perform weight learning or bias learning using learning data stored the memory to calculate initial weight values and initial bias values of the multi-layer convolutional neural network circuit; a trial recognition process to perform a recognition process to part of the learning data or of input data using the initial weight values and the initial bias values; a processing treatment process to multiply the initial weight values and the initial bias values by a positive constant to calculate processed weight values or processed bias values; and a recognition process to perform a recognition process using the processed weight values and the processed bias values.

Hereinafter, embodiments will be explained in detail with reference to the drawings.

First Embodiment

Figure 1:
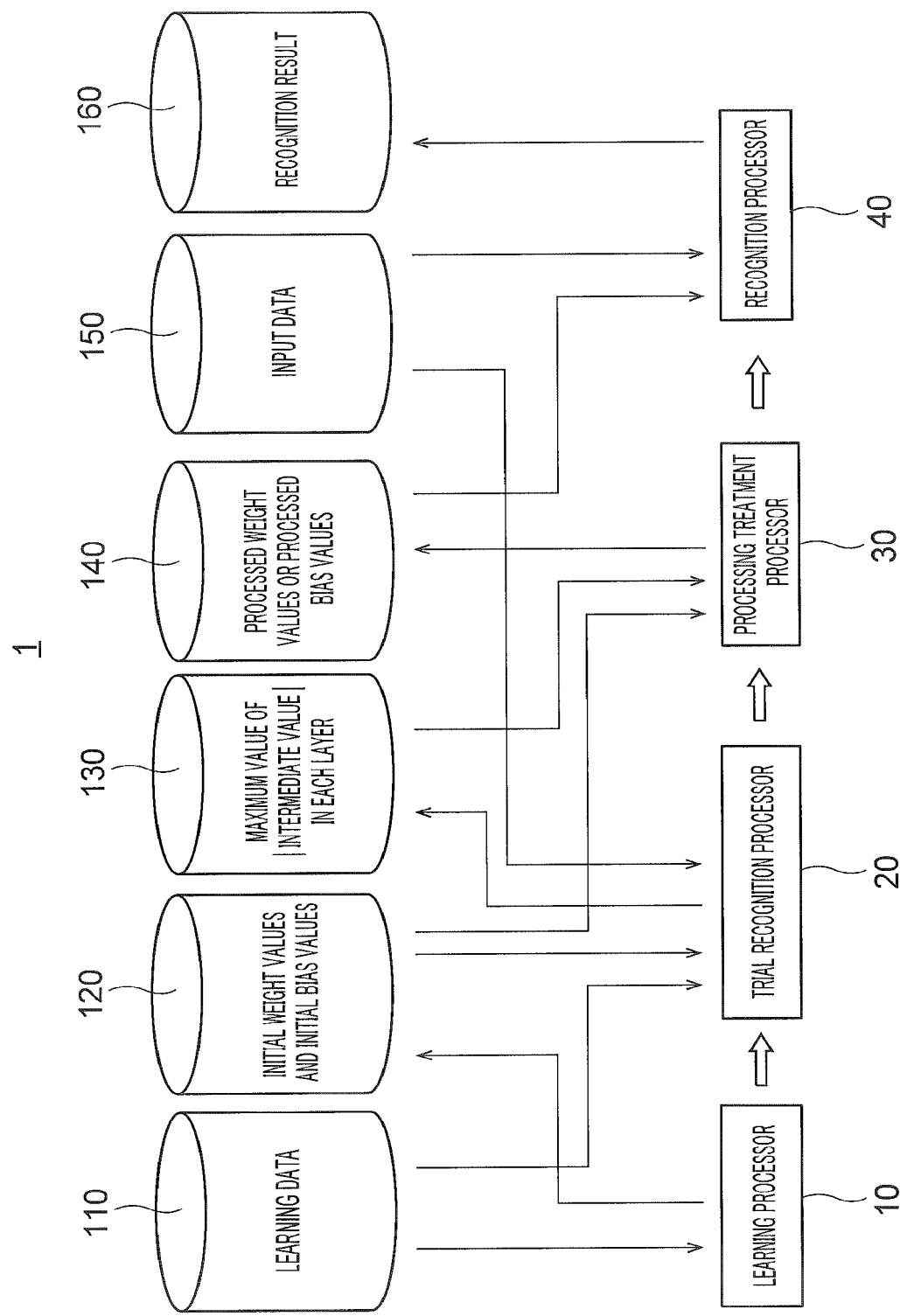
FIG. 1 is a schematic diagram showing an arithmetic processing device according to a first embodiment.

FIG. 1 shows an arithmetic processing device that realizes a multi-layer convolutional neural network circuit, according to a first embodiment. The arithmetic processing device 1 of the present embodiment includes a learning processor 10, a trial recognition processor 20, a processing treatment processor 30, a recognition processor 40, and memories 110, 120, 130, 140, 150, and 160.

An operation of the arithmetic processing device 1 of the present embodiment is as follows. First of all, the learning processor 10 performs learning using learning data stored in the memory 110, that is, a plurality of groups of numerical values. As a result of the learning, initial weight values and initial bias values are obtained and stored in the memory 120. The learning processor 10 may perform relearning using weight values or bias values obtained previously by the learning, as learning initial values.

Subsequently, the trial recognition processor 20 performs a recognition process to some input data (part of input data) among input data stored in the memory 150, using the initial weight values and the initial bias values stored in the memory 120. In the present specification, this recognition process is referred to as a trial recognition process. The learning data stored in the memory 110 may be used as the input data to be used in the trial recognition process. The maximum value of absolute values of intermediate values appearing in each layer of the multi-layer convolutional neural network circuit is extracted through the trial recognition process. The extracted maximum value of the absolute values of the intermediate values in each layer is stored in the memory 130. In the present specification, all values related to an arithmetic process performed in each-layer processing, that is, input values, weight values, bias values, values obtained by any one of addition, subtraction, multiplication and division of those values, values obtained further by any one of addition, subtraction, multiplication and division of those arithmetic results, and final values in those processes are referred to as intermediate values. When the total number of layers of the multi-layer convolutional neural network circuit in question is denoted as N, all of N layers are not required to be a convolution process, that is, even some of the layers are a full connection process, the same effect as shown below is obtained. The maximum value of absolute values of intermediate values in an n-th layer with respect to $1 \leq n \leq N$ is denoted as $M_n$, under a condition that $M_n$ is not zero to every n ($1 \leq n \leq N$).

Subsequently, the processing treatment processor 30 processes weight values and bias values in each layer, using the initial weight values and the initial bias values stored in the memory 120 and the maximum value of absolute values of intermediate values in each layer stored in the memory 130. For example, $1/M_n$ is multiplied to bias values of the n-th layer with respect to $1 \leq n \leq N$, for example, $M_{n-1}/M_n$ is multiplied to weight values in the n-th layer with respect to $2 \leq n \leq N$, and, for example, $1/M_1$ is multiplied to weight values in the first layer. Processed weight values and processed bias values are obtained through the above processes and stored in the memory 140.

Using the processed weight values and the processed bias values obtained as above, the recognition processor 40 performs a recognition process to the input data stored in the memory 150, an obtained result of recognition being stored in the memory 160.

Figure 2:
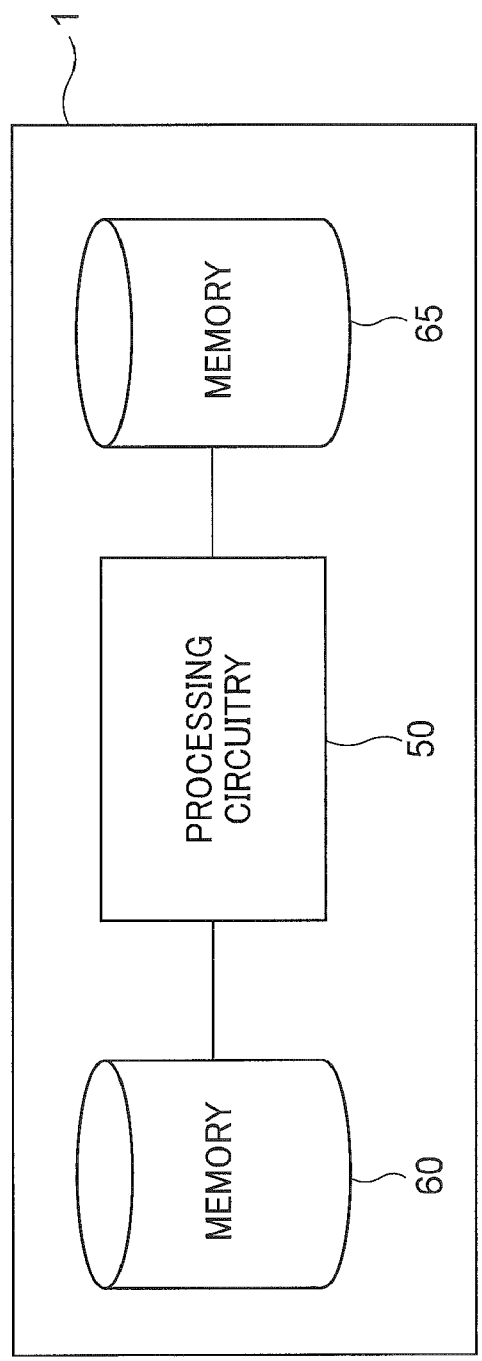
FIG. 2 is a general schematic diagram showing the arithmetic processing device according to the first embodiment.

Therefore, as shown in FIG. 2, the arithmetic processing device 1 of the first embodiment generally includes a processing circuitry 50, a memory 60, and a memory 65. The processing circuitry 50 includes the learning processor 10, the trial recognition processor 20, a processing treatment processor 30, and the recognition processor 40. The memory 60 includes the memory 110, the memory 120, the memory 130, the memory 140, and the memory 150. The memory 65 includes memory 160.

A conventional arithmetic processing device performs a recognition process using the weight values and the bias values obtained in a learning process, with no processing to the weight values or the bias values.

In contrast to the above, in the arithmetic processing device 1 of the present embodiment, the trial recognition processor 20 performs a trial recognition process using initial weight values and initial bias values obtained by the learning processor 10. And then based on a result of the trial recognition process, the processing treatment processor 30 processes the initial weight values and the initial bias values obtained by the learning processor 10 to obtain processed weight values and processed bias values, and then the recognition processor 40 performs a recognition process using the processed weight values and the processed bias values. Through the above processes, fixed-point number processes can be performed with the same number of bits over the entire layers of the convolutional neural network circuit, with no decrease in recognition accuracy. Accordingly, the number of bits required for the recognition process is decreased, and as a result, the required memory capacity is decreased and the processing time required for increased freedom of parallel processing is decreased. As a result, the production cost is restricted and a high-performance arithmetic processing device capable of high-speed operation is provided.

What is explained next is the reason why, by performing the process of the present embodiment, the recognition process can be performed, with the fixed-point number processes with the same number of bits over the entire layers, with no decrease in recognition accuracy, and the reason why the number of bits required for the recognition process is decreased.

What is considered first is how the number of bits is determined required for the fixed-point number processes with the same number of bits over the entire layers. The lowest digit should be set under the condition of no decrease in recognition accuracy. The highest digit should be set under the condition of no occurrence of overflow in the course of arithmetic processing because the occurrence of overflow due to lack of digits should be avoided in the course of arithmetic processing.

As described above, in general, comparatively large values are treated in some layers whereas comparatively small values are treated in other layers. The arithmetic processing is performed with fixed-point number processes with the same number of bits over the entire layers. Therefore, the arithmetic processing is performed with extremely high accuracy in layers where comparatively large values appear, whereas, conversely, the arithmetic processing is performed under the situation of treating extremely large values in layers where comparatively small values appear.

For the reason above, it is preferable that the maximum value of absolute values of intermediate values is the same for each layer. It is supposed here that a positive number $C_1$ is selected freely and then weight values and bias values in the first layer are multiplied by the same $C_1$. The first layer may be a convolution process or a full connection process. The intermediate values in the first layer are all $C_1$ times. Since $C_1$ is defined as a positive number, even if, following to the process of the first layer, a pooling process, that is, a process of extracting the maximum value from among a predetermined number of numerical values, a process of obtaining an arithmetic mean value of those numerical values, etc. are performed, the results are all $C_1$ times. Moreover, since $C_1$ is defined as a positive number, even if a Rectified Linear Unit process, that is a process (also written in ReLU process, hereinafter) of extracting either one of each value or zero, which is larger than the other, is performed to an output result of the first layer, the results of this process are all $C_1$ times. In addition to the above process, a positive number $C_2$ is selected freely, and then weight values in the second layer are multiplied by the same $C_2/C_1$, and bias values in the second layer are multiplied by the same $C_2$. The intermediate values in the second layer are all $C_2$ times. Since $C_2$ is defined as a positive number, even if, a pooling process or ReLU process is performed to the output results of the second layer, the results of this process are all $C_2$ times. The second layer may be a convolution process or a fully connection process.

It is easily understood that the result of above is generalized as follows. A positive number $C_n$ ($1 \leq n \leq N$) is selected freely, and then bias values in the n ($1 \leq n \leq N$)-th layer are multiplied by $C_n$, weight values in the n ($2 \leq n \leq N$)-th layer are multiplied by $C_n/C_{n-1}$, and weight values in the first layer are multiplied by $C_1$. The intermediate values in the n $(1 \leq n \leq N)$-th layer are all $C_n$ times. A pooling or ReLU process to the output result of each layer gives the same result.

Therefore, when a positive number C is selected freely and then $C/M_n$ is selected as the above $C_n$, in which the maximum value of absolute values of intermediate values in the n $(1 \leq n \leq N)$-th layer is $M_n$, the maximum value of the absolute values of the intermediate values in the n $(1 \leq n \leq N)$-th layer is C irrespective of layers. Any of the layers may be a convolution process or a full connection process. Therefore, a postulate about how the highest digits should be set is determined in the same way irrespective of layers. Accordingly, because of the same postulate over the entire layers, processing under a condition of treating extremely large values is prevented from being performed. As a result, the number of bits is decreased, required for fixed-point number processes with the same number of bits over the entire layers. Therefore, it is essential to perform the determination of a positive value to be multiplied to weight values and bias values in view of the intermediate values in each layer, in order to decrease the number of bits required for fixed-point number processes with the same number of bits over the entire layers. In view of the arithmetic processing performed based on binary digits, it is preferable to select an integer power of 2 as the above positive constant C, because the set bits are used most effectively.

Figure 3:
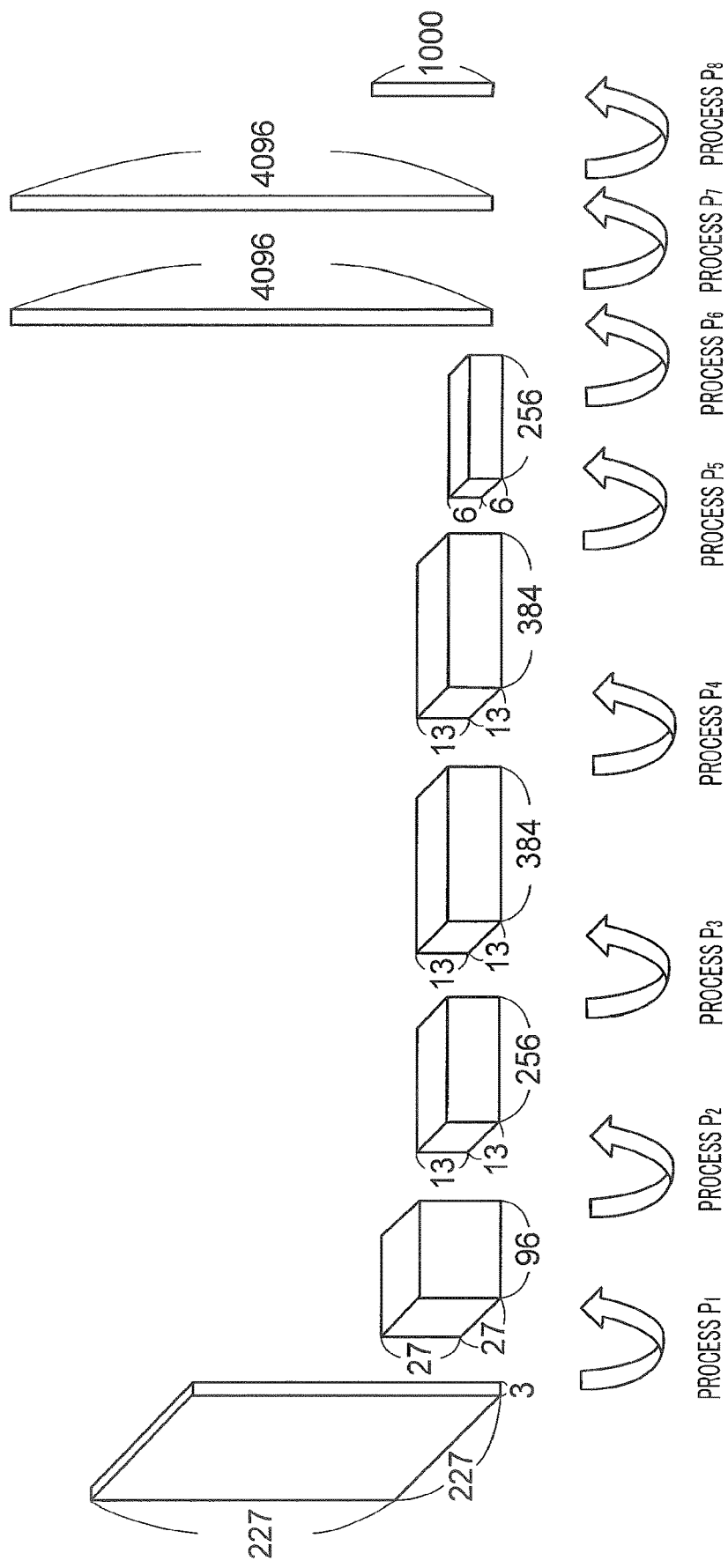
FIG. 3 is a schematic diagram showing a neural network circuit used for the verification of effects in the arithmetic processing device of the first embodiment.

Results of consideration using a specific example will be shown below. The specific example is to successively perform processes $P_1$ to $P_8$ shown in FIG. 3. A neural network that successively performs the following processes is considered.

1) Process $P_1$

A convolution process using a kernel having a size of 11×11 is performed to input values having a size of 227×227 and a depth of 3. The amount of kernel movement is 4 in a stride, that is, a process of obtaining a sum of products in a convolution process, with no padding process, that is, a process of padding zeros with a predetermined width around numerical values to increase the size before a convolution process. As a result, an output having a size of 55×55 and a depth of 96 is obtained. Subsequently, a pooling process is performed with a kernel having a size of 3×3, with a stride of 2, but with no padding process. As a result, an output having a size of 27×27 and a depth of 96 is obtained.

2) Process $P_2$

Subsequently, a convolution process using a kernel having a size of 5×5 is performed to the output of the process $P_1$, with a stride of 1 and a width of 2 in the padding process. As a result, an output having a size of 27×27 and a depth of 256 is obtained. Subsequently, a pooling process is performed with a kernel having a size of 3×3, with a stride of 2, but with no padding process. As a result, an output having a size of 13×13 and a depth of 256 is obtained.

3) Process $P_3$

Subsequently, a convolution process using a kernel having a size of 3×3 is performed to the output of the process $P_2$, with a stride of 1 and a width of 1 in the padding process. As a result, an output having a size of 13×13 and a depth of 384 is obtained.

4) Process $P_4$

Subsequently, a convolution process using a kernel having a size of 3×3 is performed to the output of the process $P_3$, with a stride of 1 and a width of 1 in the padding process. As a result, an output having a size of 13×13 and a depth of 384 is obtained.

5) Process $P_5$

Subsequently, a convolution process using a kernel having a size of 3×3 is performed to the output of the process $P_4$, with a stride of 1 and a width of 1 in the padding process. As a result, an output having a size of 13×13 and a depth of 256 is obtained. Subsequently, a pooling process is performed with a kernel having a size of 3×3, with a stride of 2, but with no padding process. As a result, an output having a size of 6×6 and a depth of 256 is obtained.

6) Process $P_6$

Subsequently, a full connection process is performed to the output of the process $P_5$ to obtain an output having a magnitude of 4096.

7) Process $P_7$

Subsequently, a full connection process is performed to the output of the process $P_6$ to obtain an output having a magnitude of 4096.

8) Process $P_8$

Subsequently, a full connection process is performed to the output of the process $P_7$ to obtain an output having a magnitude of 1000.

Recognition with the above processes $P_1$ to $P_8$ was performed to German traffic signs, using the arithmetic processing device 1 of the present embodiment. There were 43 types of traffic signs. Learning of initial weight values and initial bias values was performed by the learning processor 10 using 39,209 images in total. Following to this, a trial recognition process with the initial weight values and the bias values was performed by the trial recognition processor 20 to the first to 100-th images of 12,569 images for recognition.

Comparative Example

Figure 4:
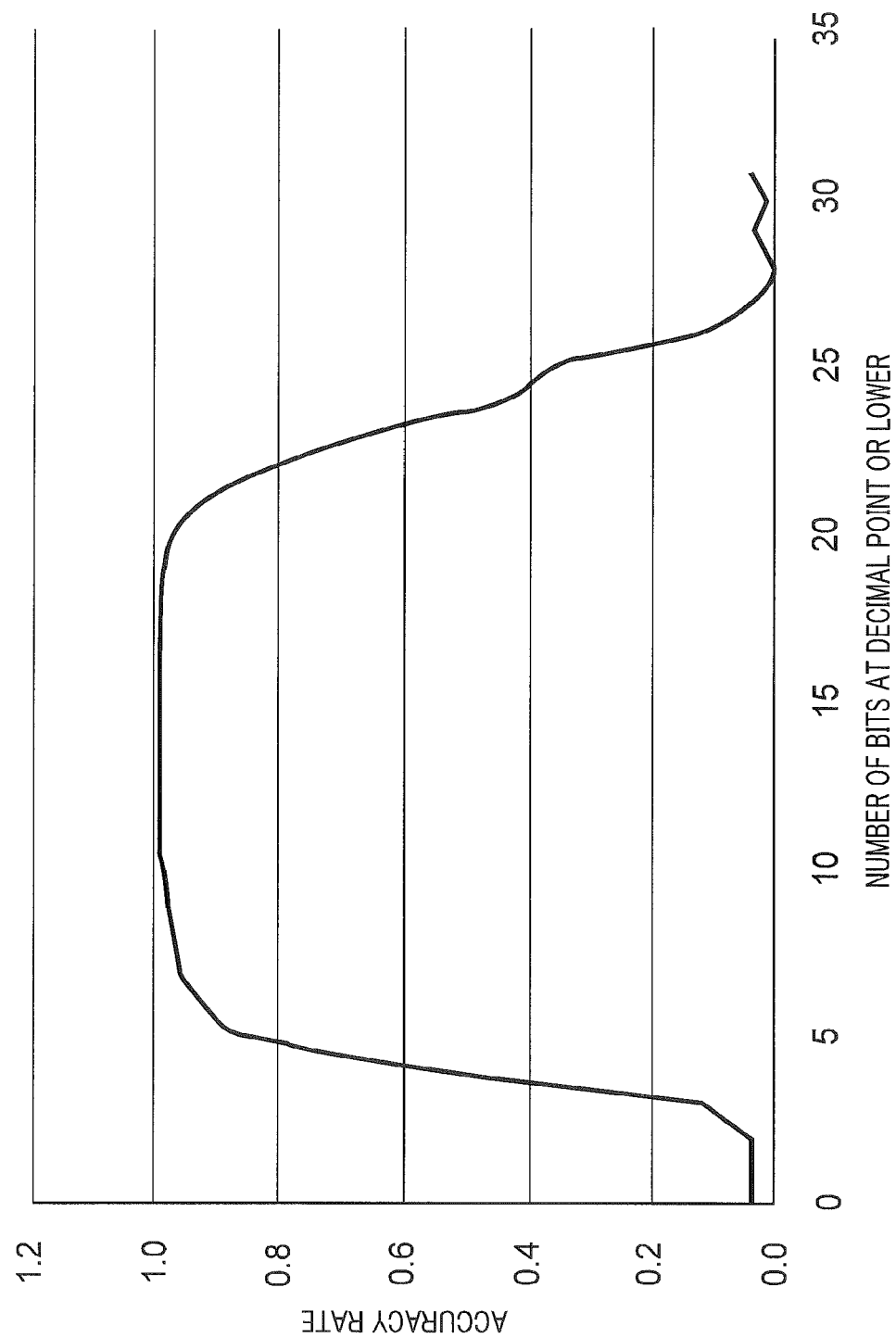
FIG. 4 is an illustration showing the dependency of an accuracy rate in recognition using an initial weight and a bias, on the number of bits in a fractional part.

First of all, recognition was performed using an arithmetic processing device of a comparative example, with weight values and bias values obtained in a learning process, with no processing to the weight values and bias values. Recognition to 100 images gave an accuracy rate of 99%, in floating-point number processes with the weight values and the bias values obtained in the learning process, with no process to the weight values and the bias values. Subsequently, the number of bits was examined in fixed-point number processes required for obtaining an accuracy rate of 99%, under assumption that recognition was performed with fixed-point number processes with the same number of bits over the entire layers using the initial weight values and the initial bias values. 32-bit fixed-point number calculation was performed while varying the number of bits in the fractional part, to examine the accuracy rate, in order to separate the decrease in accuracy rate due to lack of calculation accuracy, that is, lack of the number of bits in the fractional part, and the decrease in accuracy rate due to the effect of overflow. The result is shown in FIG. 4. It is found from this result that 10 bits are required for the fractional part in fixed-point number calculation in order to obtain the same accuracy rate of 99% as recognition with floating-point processing. The maximum value of intermediate values appearing through the process was 46708.9023 . . . . Therefore, it is found that 16 bits are required for the integer part in fixed-point number processes so as to avoid overflow in the course of process, according to the following relational expression $2^{15}=32768<46708.9023 \ldots <2^{16}=65536$. It is therefore found that 27 (=10+16+1) bits are required for the fixed-point number processes in order to obtain an accuracy rate of 99%, including a sign bit.

In contrast to the above, in the case of the arithmetic processing device 1 of the present embodiment, with 1 selected as the above-described positive constant C, an accuracy rate of 99% was obtained at 0 bits and 15 bits in the integer part and the fractional part, respectively, in the fixed-point number processes. In other words, an accuracy rate of 99% was obtained in the 16-bit fixed-point number processes, including a sign bit. Accordingly, by using the arithmetic processing device of the present embodiment, the number of bits required for fixed-point number processes with the same number of bits over the entire layers can be decreased with no decrease in recognition accuracy, and, as a result, the production cost can be restricted.

Moreover, each of 32-bit DSPs (Digital Signal Processors) can be used as two 16-bit DSPs for the above-described arithmetic processing. As a result, required memories are reduced and the processing time required for increased freedom of parallel processing is decreased. As a result, a high-performance arithmetic processing device capable of high-speed operation is provided.

As described above, it is preferable to select an integer power of 2 as the positive number C. Recognition was performed in the same way as described above, with $2^n$ ($0 \leq n \leq 10$) selected as the positive number C. It was found that the number of bits required for obtaining an accuracy rate 99% is 16 in the case of C=1, 2, 4 and 8. However, the number of bits required for obtaining an accuracy rate of 99% is gradually increased when the positive number C is increased as C=16, 32, 64, . . . . This is because, since the intermediate values and bias values in each layer are increased as C is increased whereas the weight values are not increased except for the first layer, the lowest digit required for necessary accuracy is not increased with the increase of C. Therefore, C=1 is the best choice when considering that it is preferable to select an integer power of 2 as the positive number C.

In the present embodiment, the arithmetic processing is performed with the fixed-point number processes with the same number of bits over the entire layers. However, the arithmetic processing may be performed with the fixed-point number processes with the same number of bits in each of some groups, more than two groups, into which the entire layers are divided, and a processed weight and bias may be calculated in the same process as the present embodiment. In this way, there is an advantage in mitigation of complication along with the process of selecting the number of bits for the fixed-point number processes per layer performed for the examination in the prior art. Especially, the number of bits in the fixed-point number processes does not depend on the layers by performing the arithmetic processing with the fixed-point number processes with the same number of bits over the entire layers according to the present embodiment. Therefore, there is a big advantage in that there is no complication of the process, along with the dependency of the number of bits on the layers.

The present embodiment is explained with the example of recognition of German traffic signs, using the neural network, the configuration of which is schematically shown in FIG. 2. It is, however, a matter of course that, not only the neural network having the configuration of FIG. 2, but also another convolutional neural network gives the same effect as the present embodiment. It is also a matter of course that there is no necessity of German traffic signs as the target to be recognized, the same effect is obtained for other targets to be recognized. Moreover, it is a matter of course that there is no necessity of 100 images as the target to be recognized, the same effect is obtained for other targets to be recognized, such as sentences and sounds.

The arithmetic processing device 1 according to the present embodiment includes the learning processor 10, the trial recognition processor 20, and the processing treatment processor 30, and, using the processors, performs the learning, trial recognition and processing processes. The recognition process using the processed weight values and the processed bias values obtained as a result of the learning, trial recognition and processing treatment processes is performed by the recognition processor 40.

As described above, the integration of the arithmetic processing device including the processors up to the recognition processor gives an advantage in that it is possible that, for example, an edge device performs data storage while performing a recognition process, and then performs self-learning using the data obtained in such a manner.

Figure 5:
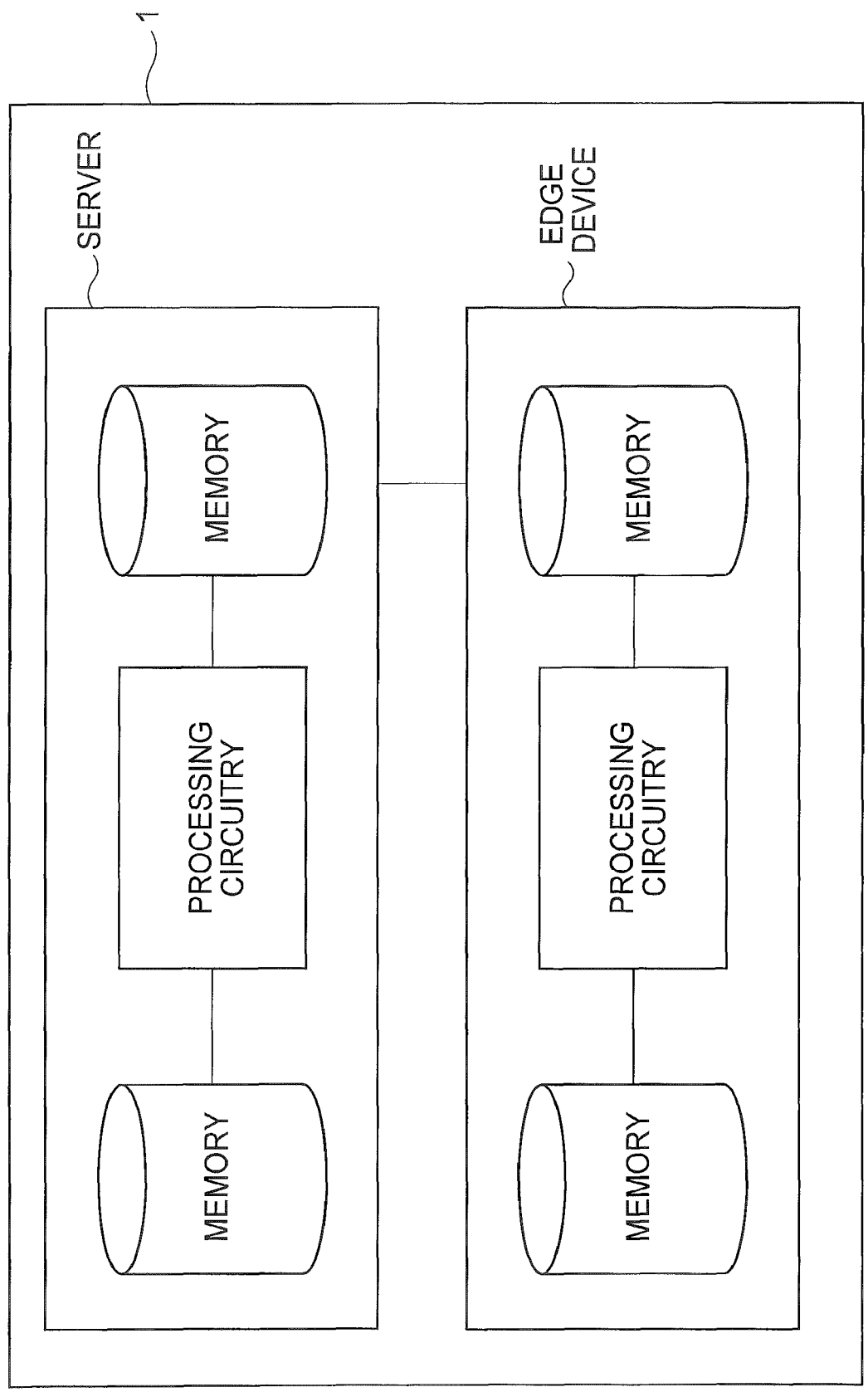
FIG. 5 is a schematic diagram showing the arithmetic processing device according to a modification of the first embodiment.

By contrast, as a modification of the present embodiment, when the recognition processor 40 is provided independent of the learning processor 10, the trial recognition processor 20, and the processing treatment processor 30, it is possible to perform, for example, the process of obtaining processed weight values or processed bias values in Cloud (Server) while an edge device performs a recognition process using the processed weight values or the processed bias values, that is, to perform the former and latter processes separately in different devices (FIG. 5). As a result, an advantage is given in that, for example, when it is enough for the edge device to perform only the recognition process, the amount of process to be performed by the edge device is mitigated.

As explained above, the present embodiment and its modification provide the arithmetic processing device capable of decreasing memory capacity even in the case of performing fixed-point number arithmetic processing.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An arithmetic processing device to realize a multi-layer convolutional neural network circuit to perform a process with fixed-point number format, comprising: a processing circuitry and a memory, the processing circuitry conducting:
   a learning process to perform weight learning or bias learning using learning data stored in the memory to calculate initial weight values and initial bias values for layers of the multi-layer convolutional neural network circuit;
   a trial recognition process to perform a recognition process to part of the learning data or of input data using the initial weight values and the initial bias values;
   a processing treatment process to multiply the initial weight values and the initial bias values by a positive constant depending on the layers to calculate processed weight values and processed bias values for the layers; and
   a recognition process using the processed weight values and the processed bias values,
   wherein the positive constant is determined from an intermediate value in a process of each layer, the intermediate value being obtained as a result of the recognition process of the trial recognition process.

2. The arithmetic processing device according to claim 1, wherein the positive constant depends on the initial weight values or the initial bias values.

3. The arithmetic processing device according to claim 1, wherein the positive constant is a value calculated from a maximum value of absolute values of intermediate values in a process in each layer, the intermediate values being obtained as a result of the recognition process of the trial recognition process, and from a positive number common to the layers of the multi-layer convolutional neural network circuit.

4. The arithmetic processing device according to claim 3, wherein the positive number common to the layers of the multi-layer convolutional neural network circuit is an integer power of 2.

5. The arithmetic processing device according to claim 4, wherein the positive number common to the layers of the multi-layer convolutional neural network circuit is 1.

6. The arithmetic processing device according to claim 1, wherein the process of the multi-layer convolutional neural network circuit is performed with fixed-point number calculation with a same number of bits over at least two layers.

7. The arithmetic processing device according to claim 1, wherein the process of the multi-layer convolutional neural network circuit is performed with fixed-point number calculation with a same number of bits over entire layers.

8. An arithmetic processing system to realize a multi-layer convolutional neural network circuit to perform in a process with fixed-point number format, comprising a first device, a second device, and a memory the first device conducting: a learning process to perform weight learning or bias learning using learning data stored in the memory to calculate initial weight values and initial bias values for layers of the multi-layer convolutional neural network circuit; a trial recognition process to perform a recognition process to part of the learning data or of input data using the initial weight values and the initial bias values; and a processing treatment process to multiply the initial weight values and the initial bias values by a positive constant depending on the layers to calculate processed weight values and processed bias values for the layers, wherein the positive constant is determined from an intermediate value in a process of each layer, the intermediate value being obtained as a result of the recognition process of the trial recognition process, and the second device conducting a recognition process using the processed weight values and the processed bias values.

9. The arithmetic processing system according to claim 8, wherein the positive constant depends on the initial weight values or the initial bias values.

10. The arithmetic processing system according to claim 8, wherein the positive constant is a value calculated from a maximum value of absolute values of intermediate values in a process in each layer, the intermediate values being obtained as a result of the recognition process of the trial recognition process, and from a positive number common to the layers of the multi-layer convolutional neural network circuit.

11. The arithmetic processing system according to claim 10, wherein the positive number common to the layers of the multi-layer convolutional neural network circuit is an integer power of 2.

12. The arithmetic processing system according to claim 11, wherein the positive number common to the layers of the multi-layer convolutional neural network circuit is 1.

13. The arithmetic processing system according to claim 8, wherein the process of the multi-layer convolutional neural network circuit is performed with fixed-point number calculation with a same number of bits over at least two layers.

14. The arithmetic processing system according to claim 8, wherein the process of the multi-layer convolutional neural network circuit is performed with fixed-point number calculation with a same number of bits over entire layers.

* * * * *